United States Patent
Carnevale et al.

(10) Patent No.: US 9,554,668 B2
(45) Date of Patent: Jan. 31, 2017

(54) BEVERAGE CARAFE LID OPEN/CLOSED DETECTION AND SYSTEM CONTROL

(71) Applicant: Keurig Green Mountain, Inc., Waterbury, VT (US)

(72) Inventors: Paolino Carnevale, Raynham, MA (US); William T. Jacobs, Lynnfield, MA (US); Hassib Hawat, Dedham, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 585 days.

(21) Appl. No.: 13/795,671

(22) Filed: Mar. 12, 2013

(65) Prior Publication Data

US 2014/0261853 A1    Sep. 18, 2014

(51) Int. Cl.
*A47J 31/06* (2006.01)
*A47J 31/46* (2006.01)
*B67D 3/00* (2006.01)
*B67D 7/32* (2010.01)

(52) U.S. Cl.
CPC ............. *A47J 31/46* (2013.01); *A47J 31/061* (2013.01); *B67D 3/0006* (2013.01); *B67D 7/32* (2013.01)

(58) Field of Classification Search
CPC .. A47J 31/061; A47J 31/4492; A47J 31/0605; B67D 7/32; B67D 7/3209; B67D 7/3218; B67D 3/0006; B67D 1/0882; B67D 3/0003; B67D 7/34; B67D 7/344; B67D 7/346; B67D 7/348
USPC .............................. 141/94, 192, 351; 99/285
See application file for complete search history.

(56) References Cited

U.S. PATENT DOCUMENTS

| | | | |
|---|---|---|---|
| 4,833,978 A | 5/1989 | Martone et al. | |
| 4,849,742 A * | 7/1989 | Warrington | G08B 21/22 340/545.6 |
| 4,924,922 A | 5/1990 | Johnson | |
| 4,997,015 A | 3/1991 | Johnson | |
| 5,251,541 A * | 10/1993 | Anson et al. | 99/280 |
| 5,503,060 A * | 4/1996 | Morecroft et al. | 99/295 |
| 5,699,719 A * | 12/1997 | Lucas et al. | 99/299 |
| 5,964,141 A | 10/1999 | Andrew et al. | |
| 6,085,638 A * | 7/2000 | Mork et al. | 99/282 |
| 6,142,063 A | 11/2000 | Beaulieu et al. | |
| 6,323,778 B1 * | 11/2001 | Simpson | A47K 13/24 200/61.62 |
| 6,857,354 B2 | 2/2005 | Reyhanloo | |
| 6,884,452 B1 * | 4/2005 | Lassota | 426/431 |

(Continued)

OTHER PUBLICATIONS

International Search Report and Written Opinion dated Jun. 24, 2014 from corresponding PCT Application No. PCT/US2014/020460.

*Primary Examiner* — Jason K Niesz
*Assistant Examiner* — Andrew Stclair
(74) *Attorney, Agent, or Firm* — Wolf, Greenfield & Sacks, P.C.

(57) ABSTRACT

A beverage forming method and system in which a carafe is positionable at a carafe receiving area of a beverage forming machine with a lid of the carafe in an open position or a closed position. The carafe may be positioned at the carafe receiving area in any one of multiple rotational positions within a range of 45 to 180 degrees, and the machine may detect whether the lid is open or not for any of the rotational positions. Beverage forming is prevented if the lid is detected to be closed, allowing the carafe to be safely stored on the machine regardless of lid position.

22 Claims, 8 Drawing Sheets

(56) References Cited

U.S. PATENT DOCUMENTS

| | | | |
|---|---|---|---|
| 6,904,840 B1 | 6/2005 | Pfeifer et al. | |
| 6,915,733 B1 | 7/2005 | Langbauer | |
| 7,673,556 B2 | 3/2010 | Spencer | |
| 7,836,820 B2 | 11/2010 | Hammad | |
| 8,056,468 B2* | 11/2011 | De'Longhi | 99/285 |
| 8,176,948 B2* | 5/2012 | Carrig | H04W 4/08 |
| | | | 141/21 |
| 8,408,257 B2* | 4/2013 | Ono | B65B 3/003 |
| | | | 141/104 |
| D719,777 S * | 12/2014 | Metaxatos et al. | D7/319 |
| 2004/0221724 A1* | 11/2004 | Lowe et al. | 99/299 |
| 2009/0020017 A1* | 1/2009 | Lin et al. | 99/284 |
| 2009/0071342 A1 | 3/2009 | Hammad et al. | |
| 2009/0324444 A1* | 12/2009 | Stratmann | 422/28 |
| 2010/0263548 A1 | 10/2010 | Kokatsu et al. | |
| 2011/0185907 A1* | 8/2011 | De'Longhi | 99/280 |
| 2013/0240084 A1* | 9/2013 | Carter et al. | 141/94 |

* cited by examiner

BEVERAGE CARAFE LID OPEN/CLOSED DETECTION AND SYSTEM CONTROL

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application Publication 2011/0185907 discloses a coffee machine and receptacle that can be docked at a filling position on the machine to receive coffee made by the machine. The machine can detect the presence of the receptacle at the filling position, and starts an operating mode to produce coffee when the receptacle is at the filling position. However, the receptacle cannot be placed at the filling position unless a lid of the receptacle is oriented so that a recess in the lid is registered with a beverage spigot of the machine. U.S. Pat. No. 5,503,060 discloses a coffee maker that includes a carafe with a pivotal top lid. The brewer is arranged so that the carafe cannot be placed at a position to receive coffee from the machine unless the lid is in the open position.

SUMMARY OF INVENTION

In some embodiments, a carafe of a beverage forming apparatus may be positioned at a carafe receiving area of a beverage forming machine to receive beverage whether a lid of the carafe is open or not. Thus, the carafe may be placed at the carafe receiving area whether or not the carafe is intended to receive beverage from the beverage forming machine. This is in contrast to some systems in which a carafe cannot be placed at a carafe receiving area unless a lid of the carafe is in an open position to receive beverage. As a result, aspects of the invention provide for a more convenient and easier to operate system, e.g., because a user need not be concerned with lid position or its open/closed state to place a carafe at a receiving area of a beverage machine. Moreover, undesired dispensing of beverage when the carafe lid is closed can be prevented by detecting a position of the lid while the carafe is at the receiving area. Thus, even if a user tries to create a beverage with the carafe at the receiving area and the lid is closed, the beverage forming machine can detect the lid closed state and prevent beverage dispensing. In some embodiments, the lid open/closed state can be detected for multiple rotational positions of the carafe at the receiving area. Thus, a user may conveniently place the carafe in a relatively wide range of rotational positions, e.g., in a position in a range of 45-180 degrees, yet still allow the beverage machine to detect the lid open/closed state.

In one aspect of the invention, a beverage forming apparatus includes a beverage carafe having an interior space for holding a beverage, a beverage opening through which beverage is dispensable into the interior space, and a lid movable between an open position in which the beverage opening is uncovered by the lid and a closed position in which the opening is covered by the lid. The apparatus may also include a beverage forming machine, e.g., having a housing with a carafe receiving area to receive the carafe and dispense beverage into the carafe via the beverage opening. The carafe receiving area may receive the carafe with the lid in the open position and in the closed position, and in some embodiments may receive the carafe in any one of a number of different rotational positions. Thus, when the carafe is at the carafe receiving area, the carafe is associated with the housing to receive beverage dispensed into the beverage opening. The beverage forming machine may also include a carafe lid detector arranged to detect whether the carafe lid is in the open or closed position with the carafe in the carafe receiving area, a beverage forming station supported by the housing and arranged to combine a precursor liquid with a beverage material to form a beverage that is dispensed into the carafe at the carafe receiving area, and a precursor liquid supply system supported by the housing for providing precursor liquid to the beverage forming station. A control circuit of the machine may be arranged to control the liquid supply system to deliver precursor liquid to the beverage forming station to dispense a beverage only when the carafe lid is detected in the open position with the carafe at the carafe receiving area. That is, in some embodiments, the lid detector may only be able to actually detect the lid in an open position, but is not capable of detecting the lid in the closed position. Regardless, the lid detector is said to be capable of detecting whether the lid is open or closed because it can detect at least one state of the lid. If the lid is not detected to be in the open position, it may be assumed that the lid is closed, or effectively closed since the carafe is not placed at the receiving area. Thus, the machine may be prevented from dispensing beverage to the carafe if the carafe lid is detected to be closed or the carafe is not present at the receiving area.

In some embodiments, the carafe is positionable at the carafe receiving area in any one of a number of rotational positions relative to the housing within a 45 to 180 degree range. For example, the carafe may be positionable at the carafe receiving area in any one of a number of rotational positions relative to the housing within a 90 degree range. While the carafe can be configured in different ways, in some embodiments, the carafe includes a handle arranged on a side of the carafe that is grippable by a user to lift the carafe. In one arrangement, the carafe includes a body (e.g., that defines the interior space) and the lid includes a structure that is pivotally mounted to the body such that the lid is pivotable relative to the body between the open and closed positions. In one embodiment, the lid is pivotable about a horizontal axis, but the lid may be pivotable about a vertical or other axis, or may be movable in other ways, such as by sliding motion.

In some embodiments, the lid includes a magnet, and the carafe lid detector is arranged to detect the presence of the magnet. For example, the carafe lid detector may include one or more Hall effect sensors, switches, or other components to detect a magnet attached to the lid. Of course, where the carafe is positionable at the receiving area within a wide range of angular positions, the carafe lid detector may be arranged to detect a presence of the lid in any one of a plurality of locations that each correspond to a rotational position of the carafe at the carafe receiving area relative to the housing, e.g., within a range of 45 to 180 degrees. As noted above, the carafe lid may be pivotable relative to the carafe body about a horizontal axis, and the rotational position of the carafe relative to the carafe receiving area may be defined relative to a vertical axis.

In one specific arrangement, the carafe includes a body with a circular opening at a top of the body that is larger than the beverage opening, a cover arranged over the circular opening and having a surface that defines the beverage opening near a center of the circular opening, and a lid pivotally mounted to the cover. Thus, the beverage opening may be located near a center of the circular opening and may be positioned so rotational axis of the carafe passes through the beverage opening. That is, although the carafe may be rotated between multiple positions at the carafe receiving area, an axis around which the carafe may be rotated may pass through the beverage opening. As a result, the beverage opening may remain relatively stationary for different rotational positions of the carafe. The carafe may also include a spout from which beverage is pourable from the interior space, i.e., beverage may enter the interior space via the beverage opening and may exit the interior space via the spout.

In another aspect of the invention, a method for controlling a beverage forming apparatus includes placing a carafe at a carafe receiving area of a beverage forming machine. The carafe may have an interior space for holding a beverage, a beverage opening through which beverage is dispensable into the interior space, and a lid that is movable between an open position in which the beverage opening is uncovered by the lid and a closed position in which the beverage opening is covered by the lid. The lid may be detected to be in the open or closed position with the carafe at the carafe receiving area, and operation of the beverage forming apparatus to dispense a beverage may be prevented unless the lid is detected to be open or if the lid is detected to be in the closed position with the carafe at the carafe receiving area.

In some embodiments, the step of placing the carafe includes placing the carafe at the carafe receiving area in any one of a plurality of different rotational positions within a range of 45 to 180 degrees. A noted above, the carafe may include a handle arranged on a side of the carafe that is grippable by a user to lift the carafe, as well as a body that defines the interior space. The lid may include a structure that is pivotally mounted to the body such that the lid is pivotable relative to the body between the open and closed positions, e.g., about a horizontal axis. Detecting the lid position may include detecting a presence of a magnet attached to the lid for at least one position, and the lid presence may be detected for a range of rotational positions of the carafe relative to the beverage forming machine.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
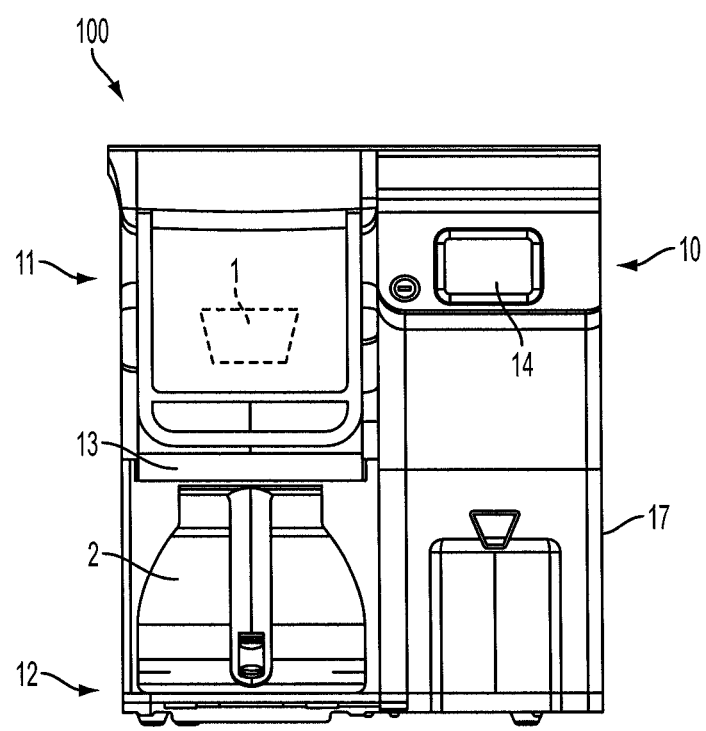
FIG. 1 is a front view of a beverage forming apparatus with a carafe located at a carafe receiving area of a beverage forming machine in an illustrative embodiment.

FIG. 1 shows a front view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a carafe 2. (As used herein, a carafe is any suitable container arranged to receive a dispensed beverage.) If used, the cartridge 1 may be manually or automatically placed in a beverage forming station 11 of a beverage forming machine 10. For example, the beverage forming station 11 may include a cartridge receiver that is exposed to receive the cartridge 1 when the user operates a handle or other actuator. With the cartridge 1 placed in the cartridge receiver, the actuator may be operated to at least partially enclose the cartridge 1, e.g., so that water or other precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in an embodiment of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not be used, and instead beverage material used to form a beverage may be provided to a mixing chamber or brew basket by a user or via a hopper system.

Figure 2:
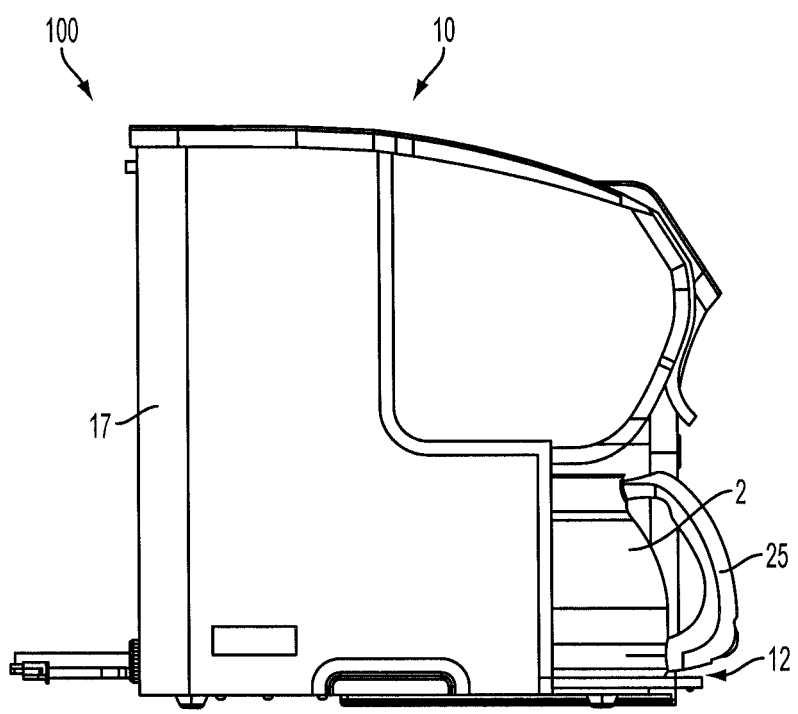
FIG. 2 is left side view of the FIG. 1 embodiment.
Figure 3:
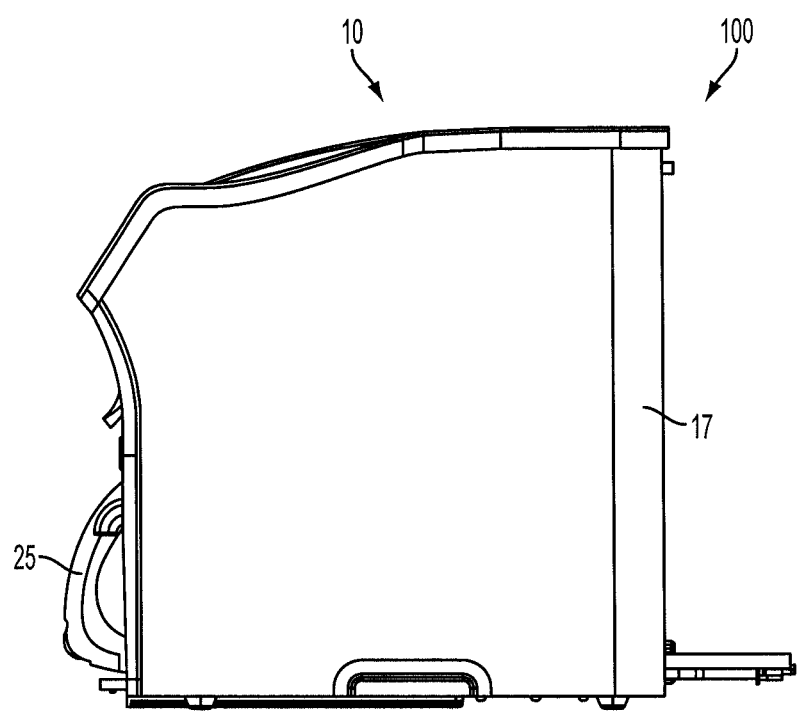
FIG. 3 is a right side view of the FIG. 1 embodiment.
Figure 4:
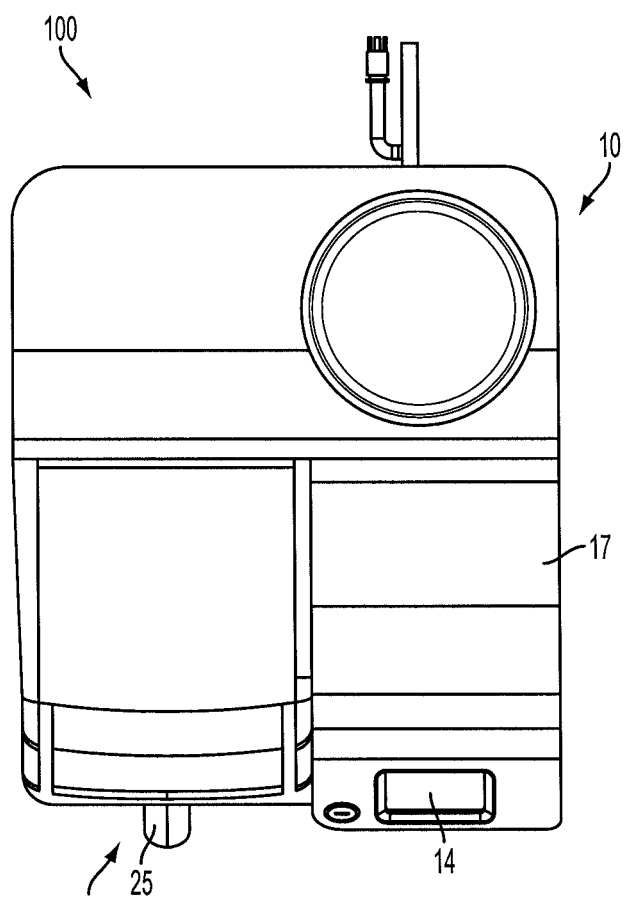
FIG. 4 is a top view of the FIG. 1 embodiment.

In this embodiment, the beverage forming machine 10 includes a housing 17 that houses and supports components of the machine 10, such as a user interface 14 used to control system operation, and defines a carafe receiving area 12 at which the carafe 2 is positionable to receive beverage dispensed by the machine 10. Thus, at the carafe receiving area 12, the carafe 2 is associated with the machine 10 to receive a dispensed beverage and may be supported by the housing 17. As can be seen in FIGS. 2-4, the carafe 2 may be received at the carafe receiving area 12 so that the carafe 2 is at least partially surrounded by the housing 17. However, in other arrangements, the carafe 2 may be more exposed when at the carafe receiving area 12.

Although in this embodiment, the carafe 2 is at least partially surrounded by the housing 17 of the beverage forming machine 10, the carafe 2 is positionable at the carafe receiving area 12 in a plurality of rotational positions relative to the housing 17. For example, the carafe 2 may be placed at the carafe receiving area 12 at any of a number of rotational positions within a range of 45-120 degrees or more. That is, in this embodiment, the carafe 2 may be placed at carafe receiving area 12 such that the handle 25, which is attached at a side of the carafe 2 and is grippable by a user to manipulate the carafe, is located to the left or the right of that shown in FIG. 1. The rotational position of the carafe 2 relative to the housing 17 may be defined about a vertical axis, e.g., that is generally perpendicular to a surface that supports a bottom of the carafe 2 at the carafe receiving area 12. However, the carafe 2 may be arranged so that the carafe 2 can receive beverage dispensed by the machine 10 at any of the rotational positions. For example, the carafe 2 may have a beverage opening that receives dispensed beverage located at an axis of rotation of the carafe 2. In this way, although the carafe 2 may be rotated at the receiving area 12, the beverage opening may not move any substantial amount due to rotation. Accordingly, if a beverage outlet of the machine 10 is located over the beverage opening, the beverage opening may be positioned to receive beverage regardless of the carafe's rotational position. Other arrangements are possible, however, such as one in which the carafe 2 includes a funnel that communicates with the beverage opening and that is wide enough to receive beverage dispensed by the machine 10 for all positions of the beverage opening.

In accordance with an aspect of the invention, the apparatus 100 may include a carafe lid detector 13 that is arranged to detect whether a lid that covers the beverage opening of the carafe 2 is in an open position or a closed position. Details regarding an illustrative embodiment of a lid detector 13 are described below, but a lid detector 13 could be arranged in any suitable way. For example, the lid detector 13 may include a camera or other imaging device that images a portion of the carafe 2 and uses image analysis to determine whether a lid of the carafe is in an open or closed position. In another embodiment, the lid detector 13 may include a probe that detects whether the lid is in an open or closed position. For example, the probe may be spring biased to move downwardly into the beverage opening of the carafe 2 if the lid is in an open position, but will be held in an upper position by the lid if the lid is in the closed position covering the beverage opening. In other arrangements, any suitable sensors may be used to detect a lid's presence, such as magnetic, inductive, resistive, capacitive or other sensors used to detect a magnetic or other physical characteristic of a lid. In yet another embodiment, a lid detector 13 may include an antenna or other component arranged to detect the presence of an RFID tag or other component on the lid that can be detected via radio frequency energy. The lid detector 13 may be arranged to actually detect the lid at two different positions, e.g., an open position and a closed position, or may be arranged to actually detect the lid in only one position, e.g., the open position or the closed position. In embodiments where the lid detector 13 is arranged to actually detect the lid at only one position, the detector or associated control circuit may infer that the lid is at the other position when the detector fails to detect the lid. For example, if the lid detector is arranged to detect the presence of the lid at the open position only, the control circuit may infer or assume that the lid is in the closed position if the lid detector fails to detect the presence of the lid. In any case, the lid detector is said to be able to detect whether the lid is in the open or closed position, even where the detector can only actually detect the presence of the lid at one position.

Figure 5:
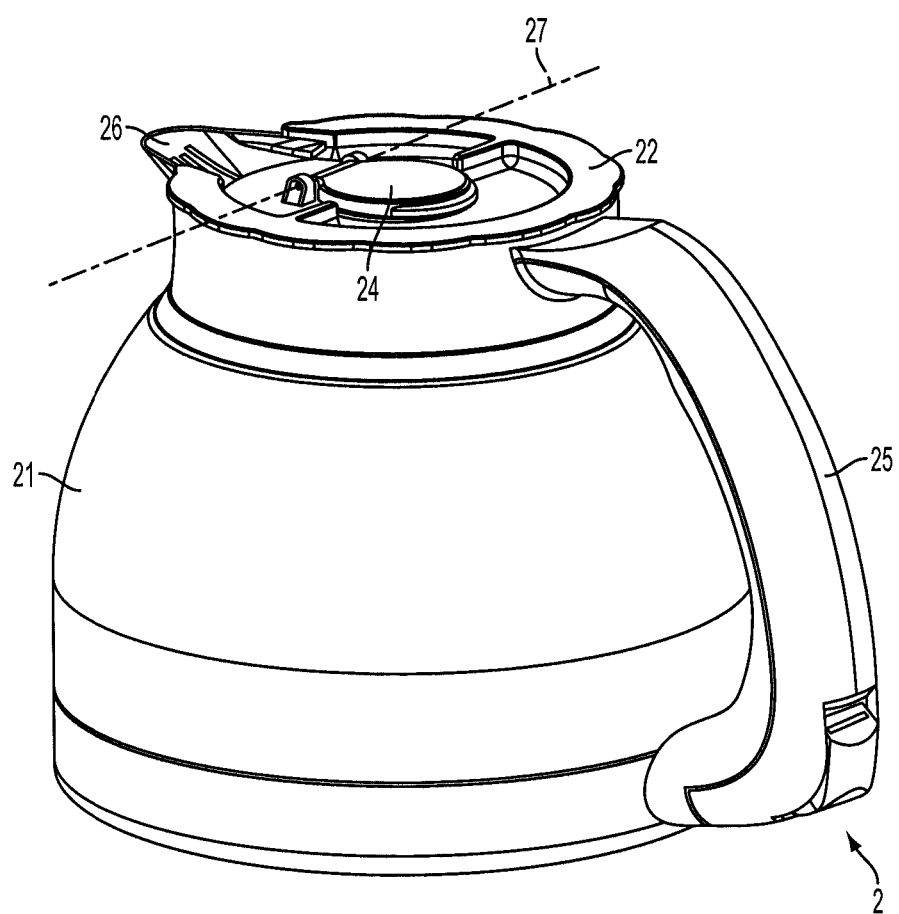
FIG. 5 is a perspective view of a carafe in an illustrative embodiment.
Figure 6:
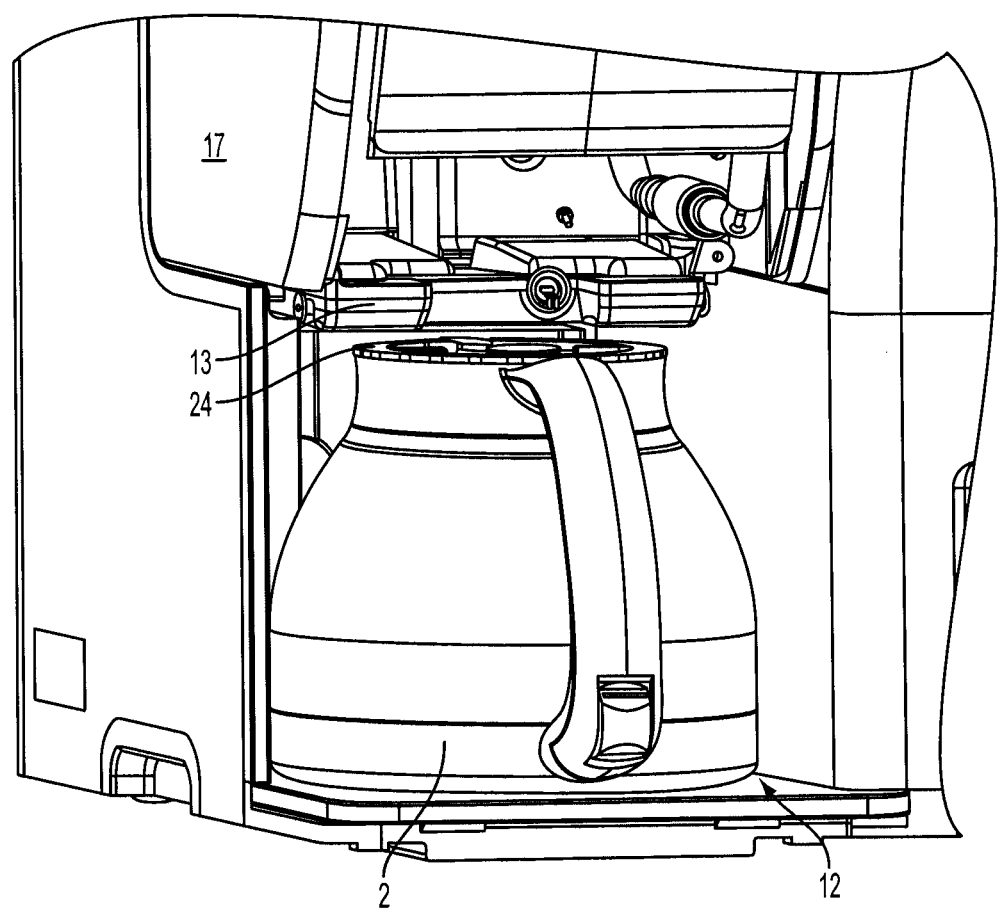
FIG. 6 is a close up perspective view of a carafe at a carafe receiving area.

FIG. 5 shows a perspective view of a carafe 2 in an illustrative embodiment. The carafe 2 of FIG. 5 includes a body 21 that defines an interior space that holds a beverage. The body 21 may be shaped, formed or otherwise constructed in any suitable way and of any suitable material or combination of materials. For example, the body 21 may be formed of a molded plastic material, metal, or other, and may be insulated or not. The body 21 defines a top opening that receives a cover 22. The cover 22 may be removable from the body 21, e.g., to allow easier cleaning of the interior space, and may engage the body in any suitable way. For example, the cover 22 may have a cylindrical portion that fits within the top opening of the body 21 and one or more gaskets (such as an o-ring positioned on the cylindrical portion) may help provide a water-tight seal between the cover 22 and the body 21 when the cylindrical portion is fitted into the top opening. In another embodiment, the cover 22 may threadedly engage with the body 21, and may include a gasket (such as a rubber washer positioned between a rim of the body 21 at the top opening and the cover 22) that provides a seal when the cover 22 is tightened to the body 21.

In this embodiment, the cover 22 includes a lid 24 that is pivotally mounted to the cover 22 so that the lid 24 can pivot about a horizontal axis 27 relative to the carafe 2. Thus, a user may flip the lid 24 forwardly, away from the handle 25, to expose the beverage opening 23 (not shown in FIG. 5, but located below the lid 24). Of course, the lid 24 may be movably mounted to the carafe 2 in other ways, such as by being made rotatable relative to the cover 22 about a vertical axis or other axis transverse to the horizontal plane, being made slidable on the cover 22 (e.g., along a linear track or channel in the cover 22), and others. Also, it is possible for the lid 24 to be removable from the carafe 2. For example, the lid 24 may be made as a plug that fits into the beverage opening 23 and is removable from the opening 23. A tether (such as a string or cord) may attach the lid 24 to the carafe 2 while allowing the lid 24 to be removed from the opening 23. In any case, the lid detector 13 may detect the presence or absence of the lid 24 to determine whether the opening 23 is exposed to receive beverage.

In accordance with an aspect of the invention, the carafe 2 may be placed at the carafe receiving area 12 with the lid 24 in the open position and in the closed position. That is, whether the lid 24 covers or occludes the beverage opening 23 or not, the carafe 2 may be placed at the carafe receiving area 12. Thus, the carafe 2 may be stored in the carafe receiving area 12 regardless of the lid 24 position. As a result, the carafe 2 can be conveniently kept with the beverage forming machine 10 even if the lid 24 in a closed position, e.g., between servings of beverage from the carafe 2. Although the lid detector 13 may be positioned relatively close to the carafe 2, the arrangement of the lid 24 is such that the lid 24 does not interfere with the lid detector 13 or other part of the beverage forming machine 10 with the lid 24 in the open position. In this embodiment, the lid 24 may sit in a recess of the cover 22 and be relatively thin and flat such that with the lid 24 in the open position, the lid 24 lies within the recess and below a top edge of the cover 22.

Figure 7:
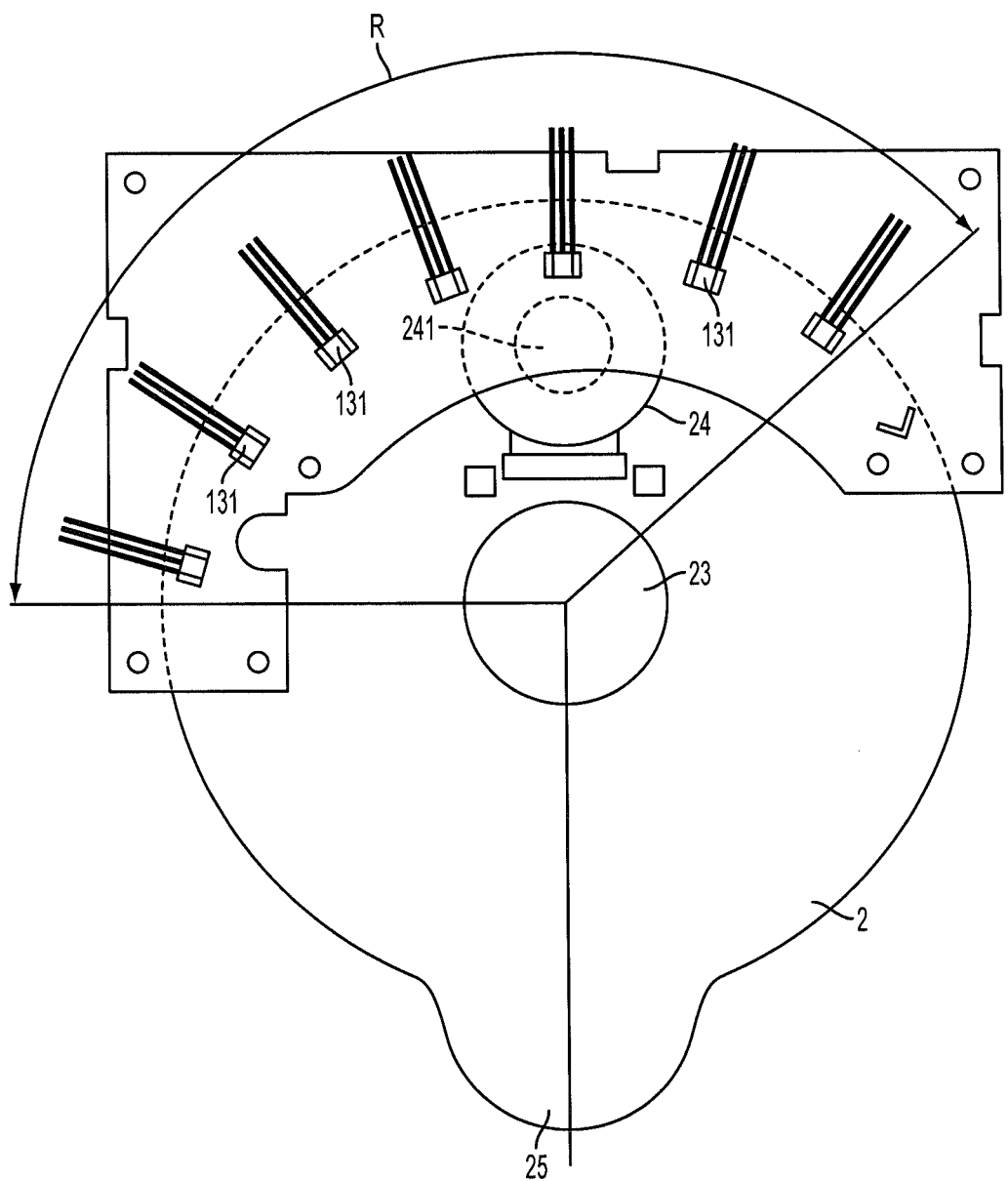
FIG. 7 is a schematic view of a carafe lid detector configuration in an illustrative embodiment.

FIG. 7 shows a schematic top view of the lid detector 13 and carafe 2 in an embodiment that illustrates how the lid 24 may be detected. In this embodiment, the lid detector 13 includes a plurality of sensor elements 131 arranged along an arc-shaped path above the carafe 2. In this embodiment, the sensor elements 131 are Hall effect sensors arranged to detect a magnet 241 attached to the lid 24 (e.g., the magnet 241 may be molded inside of the lid 24), but other sensor elements can be used depending on how the lid 24 is detected. In this example of FIG. 7, the lid 24 is in the open position and the beverage opening 23 is exposed to receive beverage. Thus, for example, the machine 10 could dispense beverage from an outlet positioned above the beverage opening 23 directly into the interior space of the carafe 2.

With the lid 24 in the open position (e.g., flipped forward in the FIG. 5 embodiment toward the spout 26), one or more of the sensor elements 131 can detect the presence of the magnet 131, and thus the lid 24, thereby confirming that the lid 24 is in the open position and the carafe 2 is at the receiving position 12. However, if the lid 24 were in the closed position covering the opening 23, none of the sensor elements 131 will detect the magnet 131, indicating that the lid 24 is closed and/or that the carafe 2 is not at the receiving position 12. In another embodiment, the lid detector 13 may detect the presence of the lid 24 at the closed position, and thereby control system operation. In such a case, another sensor may be used to detect the presence of the carafe 2 at the receiving area 12, such as a reed switch that detects a magnet in the body 21 of the carafe 2, an optical sensor that detects an interruption in a light path caused by a portion of the carafe 2, and others.

In accordance with another aspect of the invention, the carafe 2 may be placed at the carafe receiving area 12 in any one of a plurality of different rotational positions, e.g., within a range of 45-180 degrees. In the example, of FIG. 7, the carafe 2 may be placed in rotational positions within a range R of about 120 degrees relative to the housing 17. That is, the carafe 2 may be placed at the carafe receiving area 12 with the lid 24 in the open position located under the sensor elements 131 anywhere in the range R of possible positions. Limitation of the range of possible rotational positions of the carafe at the carafe receiving area 12 may be provided by mechanical interference of the handle 25 with one or more portions of the housing 16 or in other ways. For example, as can be seen in FIG. 1, the handle 25 may contact a portion of the housing 17 on the right side of the carafe receiving area 12 to limit counterclockwise rotation of the carafe 2 (as viewed from above) and may contact a portion of the housing 17 on the left side of the carafe receiving area 12 to limit clockwise rotation of the carafe 2. Limits on the carafe rotation may be provided in other ways, such as by other features formed on the carafe body 21, physical stops or other features on the cover 22, and others. Also, although in this embodiment the carafe 2 is limited to a number of rotational positions within a range of about 120 degrees, the carafe 2 may be limited to other ranges, such as 180 degrees or more, or less than 120 degrees. In yet another embodiment, the carafe 2 need not be limited to a range of positions, but instead may be placed in any one of a number of rotational positions within a 360 degree range.

Figure 8:
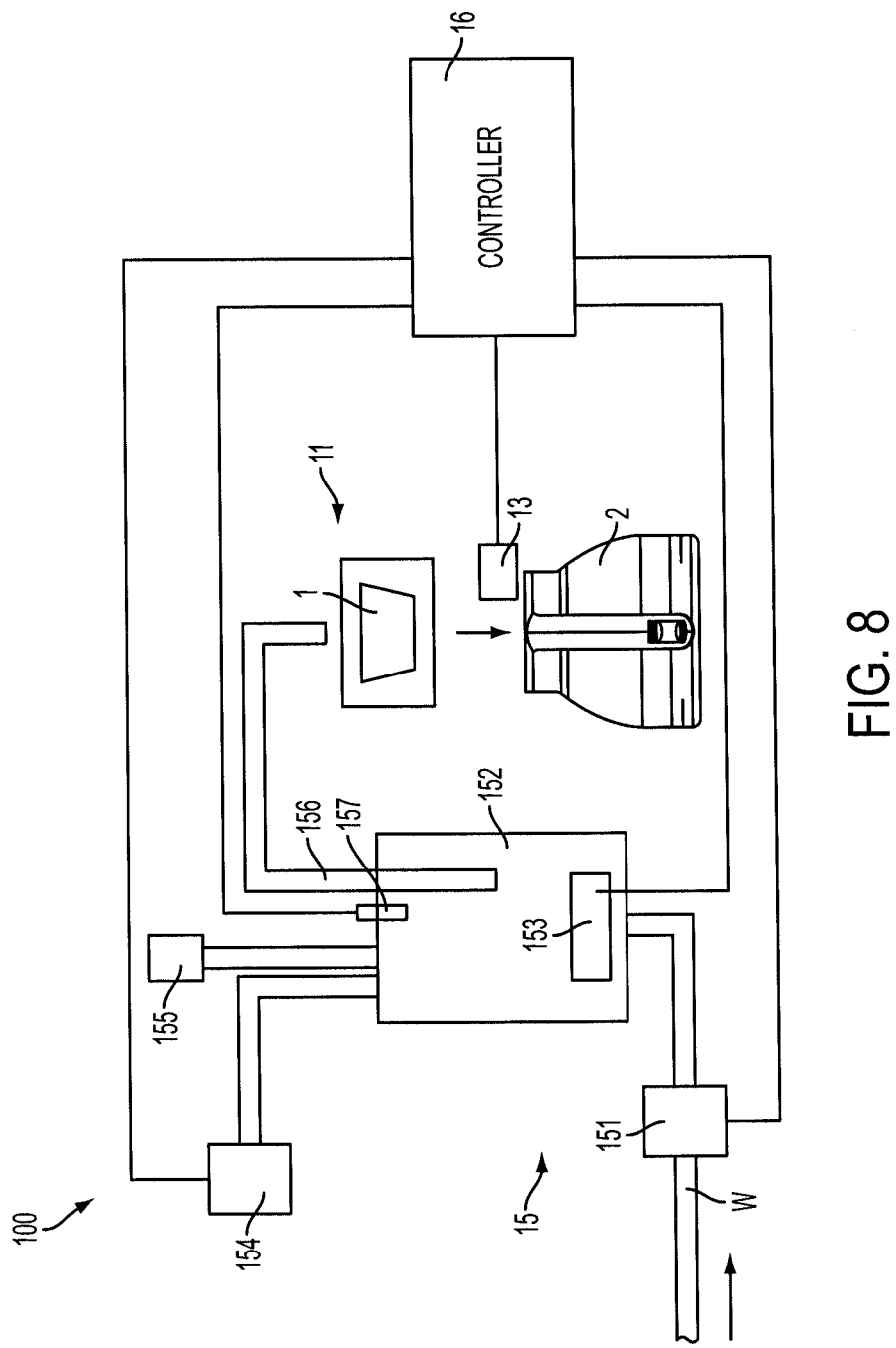
FIG. 8 a schematic diagram of components of a beverage forming apparatus in an illustrative embodiment.

FIG. 8 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the carafe 2. The liquid supply 15 in this embodiment includes a valve 151 that is coupled to a source W that provides liquid from a storage tank, a mains water supply or other source. The valve 151 is controlled by a control circuit 16 to open and close to provide a desired volume of liquid to a tank 152. For example, if the tank 152 is empty, the valve 151 may be opened until a conductive probe or other water level sensor 157 provides a signal to the control circuit 16 that indicates when liquid arrives near or at a top of the tank 152. In response to detecting liquid at the sensor 157, the control circuit 16 may close the valve 151. Of course, other arrangements for providing liquid to the tank 152 are possible, such as by a pump (e.g., a centrifugal pump, piston pump, solenoid pump, diaphragm pump, etc.). Other optional features, such as a vent 155 which can be opened or closed to vent the tank 152, a check valve or other flow controller that can prevent backflow in the conduit between the source W and the tank 152, or other features may be included. In this embodiment, the vent 155 is not controlled by the control circuit 16, but remains always open with an orifice of suitable size to allow venting for filling of the tank 152, and pressure buildup in the tank 152 to allow liquid delivery. Also, control of a volume of liquid provided to the tank 152 may be performed in other ways, such as opening the valve 151 for a defined period of time, running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or other system to otherwise condition the liquid. In this embodiment, liquid in the tank 152 may be dispensed via a conduit 156 to the beverage forming station 11. The liquid may be discharged from the tank 152 by an air pump 154 operating to force air into the tank 152 to pressurize the tank and force liquid to flow in the conduit 156 to the beverage forming station 11. Again, liquid may be caused to flow from the tank 152 to the beverage forming station 11 in other ways, such as by opening the valve 151 to force additional unheated liquid into the tank 152, thereby displacing water out of the tank 152 and into the conduit 156. A flow sensor or other suitable device may be used to determine the amount of liquid delivered to the tank 152, and thus the amount of liquid delivered to the beverage forming station 11. Alternately, a pump may be used to force additional liquid into the tank 152, or to pump liquid from the tank 152 to the forming station 11. For example, a specified volume of liquid may be delivered to the forming station 152 by operating a pump to deliver the specified volume of liquid from the source W to the tank 152, e.g., a diaphragm pump may deliver 5 ml for each pump stroke, and thus 100 ml of liquid may be delivered to the tank 152 by operating the pump through 20 pump cycles. Liquid may be introduced to the beverage forming station 11 at any suitable pressure, e.g., 1-2 psi, 30-50 psi, or higher. Although in this embodiment the conduit 156 is shown as extending into the tank 152, the conduit 156 could be arranged in other suitable ways. For example, the outlet of the heater tank 152 to the conduit 156 could be arranged at an extreme top of the tank 152, or in other ways. The conduit 156 may include a check valve or other flow controller, e.g., to help prevent backflow in the tank conduit 156 from the forming station 11.

The beverage forming station 11 may use any beverage making ingredient, such as ground coffee, tea, a flavored drink mix, or other beverage medium, e.g., contained in a cartridge 1 or not. Alternatively, the beverage forming station 11 may function simply as an outlet for heated, cooled or otherwise conditioned water or other liquid, e.g., where a beverage medium is contained in the carafe 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

As noted above, the beverage forming apparatus 100 may include a carafe lid detector 13 that detects whether the carafe lid is in an open or closed position. The detector 13 may detect the presence or absence of the lid 24, and thus detect whether the lid 24 is in the open or closed position. If the lid 24 is detected to be in the closed position, the control circuit 24 may prevent the apparatus 100 from operating to dispense a beverage to the carafe 2. Note that the apparatus 100 need not necessarily be prevented from operating to produce a beverage if the carafe lid is detected to be closed or is not detected to be open. For example, the apparatus 100 may operate to produce a beverage and store the beverage in a holding tank if the carafe lid 24 is closed. If the carafe lid 24 is detected to be in the open position, the control circuit 16 may then control the apparatus 100 to dispense the stored beverage from the holding tank to the carafe 2. As described above, the lid detector 13 may include one or more Hall effect sensors, optical detectors, reed switches, microswitches that are closed by physical contact with the carafe lid, and/or other components to detect the presence or absence of the lid 24. The control circuitry 16 may be arranged to suitably interpret any type of signal provided by the detector 13 to determine the lid open/closed state.

According to an aspect of the invention, a method for controlling a beverage forming apparatus may include placing a carafe at a carafe receiving area of a beverage forming machine where the carafe has an interior space for holding a beverage, an opening through which beverage is dispensable into the interior space, and a lid that is movable between an open position in which the opening is uncovered by the lid and a closed position in which the opening is covered by the lid. The carafe may be placed at the carafe receiving area with the lid in the open or closed position, and in some embodiments, may be placed at the carafe receiving area in any one of a plurality of rotational positions with a range of 45-180 degrees. In one specific embodiment, the carafe may be placed in any one of a plurality of different rotational positions in a 120 degree range relative to a beverage machine housing.

Next, the lid may be detected to be in the open or closed position with the carafe at the carafe receiving area. In some embodiments, the lid position may be detected by detecting whether the lid is in the open position, while in others lid position may be detected by detecting whether the lid is at the closed position. For example, if the lid is not detected at the open position, a determination may be made that the lid is in the closed position. In embodiments where lid position is inferred by the failure to detect the presence of the lid, an additional detector may be required, e.g., to detect the presence of the carafe at the carafe receiving area. In yet other embodiments, the presence of the lid may be detected at either the open or closed position.

If the lid is detected to be in the closed position with the carafe at the carafe receiving area, operation of the beverage forming apparatus to dispense a beverage may be prevented. For example, control circuitry of the beverage forming apparatus may determine based on the detection of the carafe lid at the closed position (e.g., by a failure to detect the lid at an open position), that a beverage should not be produced and dispensed into the carafe. The control circuit may provide a prompt to the user, e.g., at a display of a user interface, that the carafe lid is closed and that the user should open the lid and re-place the carafe to enable beverage production. In another embodiment, the control circuit may take automatic action to move the lid to the open position, e.g., by using a magnetic device to attract the lid and move it to the open position. In some embodiments, the carafe includes a body and the lid includes a structure that is pivotally mounted to the body such that the lid is pivotable relative to the body between the open and closed positions. For example, the lid may be pivotable about a horizontal axis, whereas the carafe may be adjustable in position at the carafe receiving area relative to the housing about a vertical axis. Thus, in some embodiments, adjusting a rotational position of the carafe at the carafe receiving area may move the lid along an arc-shaped path relative to the lid detector. Accordingly, the lid detector may be arranged to detect the lid in any one of a plurality of positions of the lid along the arc-shaped path.

For those systems employing a cartridge 1, once a cartridge is located in the beverage forming station 11, the beverage forming apparatus 100 may use the cartridge 1 to form a beverage. For example, one or more inlet needles may pierce the cartridge 1 (e.g., a lid of the cartridge) so as to inject heated water or other liquid into the cartridge 1. The injected liquid may form the desired beverage or a beverage precursor by mixing with beverage medium in the cartridge 1. The apparatus 100 may also include one or more outlet needles or other elements to puncture or pierce the cartridge 1 at an outlet side (e.g., at the lid of the cartridge) to permit the formed beverage to exit the cartridge 1. Other inlet/outlet piercing arrangements are possible, such as multiple needles, a shower head, a non-hollow needle, a cone, a pyramid, a knife, a blade, etc. Other arrangements for an inlet or outlet are possible however, e.g., the cartridge may have a permeable portion that allows water to flow into and/or beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

While aspects of the invention may be used with any suitable cartridge, or no cartridge at all, some cartridges may include features that enhance the operation of a beverage forming apparatus 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a carafe 2. As will be understood by those of skill in the art, cartridges in the form of a pod (e.g., having opposed layers of permeable filter paper encapsulating a beverage medium) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutraceuticals, etc.), and/or other beverage-making material (such as powdered milk or other creamers, sweeteners, thickeners, flavorings, and so on). In one illustrative embodiment, the cartridge 1 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus comprising:
    a beverage carafe having an interior space for holding a beverage, an opening through which beverage is dispensable into the interior space, and a lid movable between an open position in which the opening is uncovered by the lid and a closed position in which the opening is covered by the lid;
    a housing having a carafe receiving area to receive the carafe with the lid in the open and closed position and in which the carafe is associated with the housing to receive beverage dispensed into the opening;
    a carafe lid detector arranged to detect presence of the lid when the lid is in the open position, the carafe lid detector including a plurality of sensor elements spaced apart and positioned for detecting the presence of the lid in a plurality of locations that each correspond to a different rotational position of the carafe at the carafe receiving area relative to the housing;
    a beverage forming station supported by the housing and arranged to combine a precursor liquid with a beverage material to form a beverage that is dispensed into the carafe at the carafe receiving area;
    a precursor liquid supply system supported by the housing for providing precursor liquid to the beverage forming station; and
    a control circuit arranged to control the liquid supply system to deliver precursor liquid to the beverage forming station to dispense a beverage only when the lid is detected in the open position with the carafe at the carafe receiving area.

2. The apparatus of claim 1, wherein the carafe is positionable at the carafe receiving area in any one of a number of rotational positions relative to the housing within a 45 to 120 degree range.

3. The apparatus of claim 2, wherein the carafe is positionable at the carafe receiving area in any one of a number of rotational positions relative to the housing within a 90 degree range.

4. The apparatus of claim 1, wherein the carafe includes a handle arranged on a side of the carafe that is grippable by a user to lift the carafe.

5. The apparatus of claim 1, wherein the carafe includes a body and the lid includes a structure that is pivotally mounted to the body such that the lid is pivotable relative to the body between the open and closed positions.

6. The apparatus of claim 5, wherein the lid is pivotable about a horizontal axis.

7. The apparatus of claim 1, wherein the lid includes a magnet, and the carafe lid detector is arranged to detect the presence of the magnet.

8. The apparatus of claim 1, wherein the carafe lid detector is arranged to detect a presence of the lid in a plurality of locations that each correspond to a rotational position of the carafe at the carafe receiving area relative to the housing within a range of 45 to 120 degrees.

9. The apparatus of claim 8, wherein the carafe includes a body and the lid is pivotable relative to the body about a horizontal axis, and the rotational position of the carafe is defined relative to a vertical axis.

10. The apparatus of claim 1, wherein the carafe includes a body with a circular opening at a top of the body, a cover arranged over the circular opening and having a surface with the opening arranged near a center of the circular opening, and a lid pivotally mounted to the cover.

11. The apparatus of claim 10, wherein the body includes a spout from which beverage is pourable from the interior space.

12. A method for controlling a beverage forming apparatus, comprising:
    placing a carafe at a carafe receiving area of a beverage forming apparatus, the carafe having an interior space for holding a beverage, an opening through which beverage is dispensable into the interior space, and a lid that is movable between an open position in which the opening is uncovered by the lid and a closed position in which the opening is covered by the lid, and the beverage forming apparatus having a housing and a carafe lid detector;
    detecting presence of the lid when the lid is in the open position using the carafe lid detector of the beverage forming apparatus, the carafe lid detector including a plurality of sensor elements spaced apart and positioned for detecting the presence of the lid in a plurality of locations that each correspond to a different rotational position of the carafe at the carafe receiving area relative to the housing of the beverage forming apparatus; and
    preventing operation of the beverage forming apparatus to dispense a beverage unless the lid is detected to be in the open position with the carafe at the carafe receiving area.

13. The method of claim 12, wherein the step of placing includes placing the carafe at the carafe receiving area in any one of a plurality of different rotational positions within a range of 45 to 120 degrees.

14. The method of claim 13, wherein the carafe is placed at the carafe receiving area in any one of a number of rotational positions relative to the housing within a 90 degree range.

15. The method of claim 12, wherein the carafe includes a handle arranged on a side of the carafe that is grippable by a user to lift the carafe.

16. The method of claim 12, wherein the carafe includes a body and the lid includes a structure that is pivotally mounted to the body such that the lid is pivotable relative to the body between the open and closed positions.

17. The method of claim 16, wherein the lid is pivotable about a horizontal axis.

18. The method of claim 12, wherein the step of detecting includes detecting a presence of a magnet attached to the lid.

19. The method of claim 12, wherein the step of detecting includes detecting a presence of the lid in any one of a plurality of locations that each correspond to a rotational position of the carafe at the carafe receiving area relative to the housing within a range of 45 to 120 degrees.

20. The method of claim 19, wherein the carafe includes a body and the lid is pivotable relative to the body about a horizontal axis, and the rotational position of the carafe is defined relative to a vertical axis.

21. The method of claim 12, wherein the carafe includes a body with a circular opening at a top of the body, a cover arranged over the circular opening and having a surface with the opening arranged near a center of the circular opening, and a lid pivotally mounted to the cover.

22. A beverage forming apparatus comprising:
a beverage carafe having an interior space for holding a beverage, an opening through which beverage is dispensable into the interior space, and a lid movable between an open position in which the opening is uncovered by the lid and a closed position in which the opening is covered by the lid;
a housing having a carafe receiving area to receive the carafe with the lid in the open and closed position and in which the carafe is associated with the housing to receive beverage dispensed into the opening;
a carafe lid detector arranged to detect presence of the lid when the lid is in the open position, the carafe lid detector being arranged to detect the presence of the lid in a plurality of locations that each correspond to a rotational position of the carafe at the carafe receiving area relative to the housing within a range of 45 to 180 degrees;
a beverage forming station supported by the housing and arranged to combine a precursor liquid with a beverage material to form a beverage that is dispensed into the carafe at the carafe receiving area;
a precursor liquid supply system supported by the housing for providing precursor liquid to the beverage forming station; and
a control circuit arranged to control the liquid supply system to deliver precursor liquid to the beverage forming station to dispense a beverage only when the lid is detected in the open position with the carafe at the carafe receiving area.

* * * * *